United States Patent [19]

Hamada

[11] Patent Number: 4,956,722
[45] Date of Patent: Sep. 11, 1990

[54] IMAGE PROCESSING APPARATUS

[75] Inventor: Youichi Hamada, Tokyo, Japan

[73] Assignee: Kabushiki Kaisha Toshiba, Kawasaki, Japan

[21] Appl. No.: 369,228

[22] Filed: Jun. 22, 1989

Related U.S. Application Data

[63] Continuation-in-part of Ser. No. 296,841, Jan. 13, 1980, abandoned, Continuation of Ser. No. 102,228, Sep. 29, 1987.

[30] Foreign Application Priority Data

Sep. 30, 1986 [JP] Japan .................................. 61-232335

[51] Int. Cl.⁵ .............................................. H04N 1/40
[52] U.S. Cl. ................................... 358/444; 358/451; 358/261.1; 382/47
[58] Field of Search ............... 358/451, 453, 444, 445, 358/261.1, 261.2, 261.4; 382/47, 48, 56

[56] References Cited

U.S. PATENT DOCUMENTS

| | | | |
|---|---|---|---|
| 4,312,018 | 1/1982 | Nakajiri | 358/261.1 |
| 4,623,875 | 11/1986 | Wada | 358/261.1 |
| 4,893,258 | 1/1990 | Sakuragi | 382/47 |

Primary Examiner—James J. Groody
Assistant Examiner—Kim Y. Vu
Attorney, Agent, or Firm—Foley & Lardner, Schwartz, Jeffery, Schwaab, Mack, Blumenthal & Evans

[57] ABSTRACT

An image processing apparatus of parallel processing type using DDA method, capable of processing fractional image data properly by a simple configuration. The apparatus includes DDA device for generating DDA bit patterns; device for calculating an extraction starting bit width and an extraction ending bit width; and device for performing contraction of the image data in accordance with the DDA bit patterns, the extraction starting bit width, and the extraction ending bit width.

15 Claims, 5 Drawing Sheets

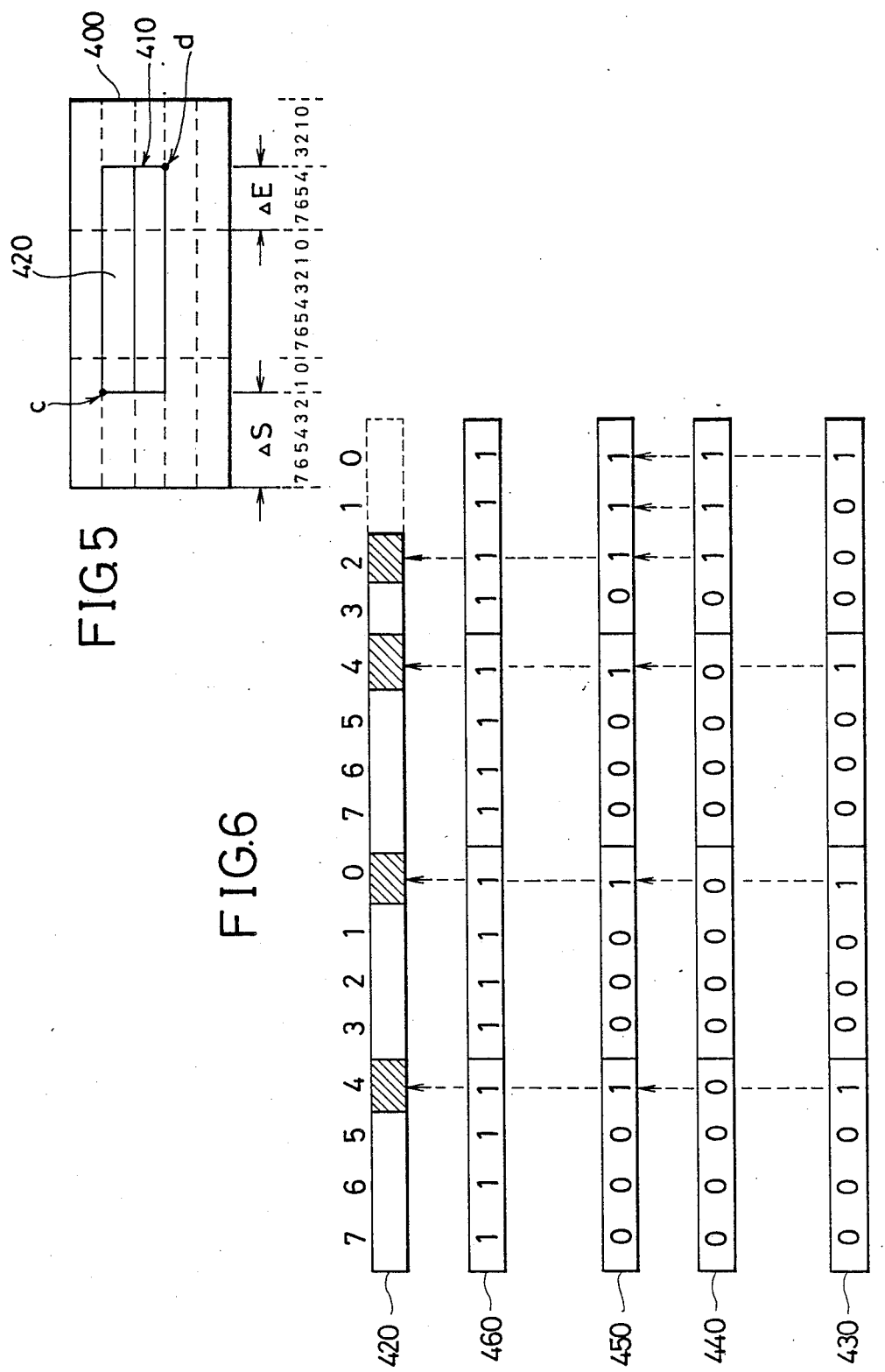

IMAGE PROCESSING APPARATUS

This application is a continuation-in-part of our earlier copending, commonly assigned application Ser. No. 296,841 filed Jan. 13, 1989 (now abandoned) which was, in turn, a continuation of commonly assigned application Ser. No. 102,228, filed Sept. 29, 1987.

BACKGROUND OF THE INVENTION

1. Field of the Invention

The present invention relates to an image processing apparatus utilizing a digital differential analyzer (referred hereafter as DDA) method of processing and, more particularly, to a mechanism of processing fractional data in such an image processing apparatus.

2. Description of the Background Art

Conventionally, processing of image data has been performed in series, bit by bit. But, with this manner of processing it has been difficult to improve a speed of processing.

As a solution to this situation, developement of processing of image data in parallel, byte by byte, has been in progress.

Now, in incorporating such a processing of image data in parallel into an image processing apparatus, mechanisms of contraction of image data are indispensable because output of image processing is to be transmitted to a CRT, a printer, or likes. Moreover, contraction of image data for the sake of selective extraction of a part of image data is also considered to be highly desirable.

A most common method of such contraction of image data has been a DDA method. However, use of the DDA method in the image processing apparatus of parallel processing type unavoidably gives rise to appearances of fractional image data due to the fact that the selective extractions are to be performed in any desired number of bit. For example, as shown in FIG. 1, when a contraction to one quarter is performed by using a DDA pattern D, a contracted image data C can be obtained in which only shaded bit spaces corresponding to "1" in the DDA pattern D is valid. However, when the contracted image data C does not have a number of bit spaces which is an interger multiple of the number of bit spaces in one byte, as in FIG. 1, a fractional image data F appears. In FIG. 1, the missing two bit spaces are also indicated by a dotted line.

Thus, such an image processing apparatus of parallel processing type using DDA method is necessarily to be equipped with a mechanism for processing fractional image data properly. But, making such a mechanism for processing fractional image data by conventional hardware structures requires an enormously complicated configuration.

SUMMARY OF THE INVENTION

It is therefore an object of the present invention to provide an image processing apparatus of parallel processing type using DDA method in which processing of fractional image data can be performed properly by a simple configuration.

According to one aspect of the present invention there is provided an image processing apparatus of parallel processing type using DDA method for processing image data, the apparatus comprising: input interface means for feeding image data to be contracted as series of predetermined number of bits; DDA means for generating DDA bit pattern indicating valid bits in the series according to a given contraction rate; correction means for detecting those series which are fractional as a series of predetermined number of bits, and generating correction bit pattern indicating validity of last bits of the series which are fractional as a series of predetermined number of bits; means for producing valid bit pattern indicating valid bits in the image data as the series of predetermined number of bits, in accordance with the DDA bit pattern and the correction bit pattern; and means for performing contraction of the image data in accordance with the valid bit pattern.

According to another aspect of the present invention there is provided an image processing apparatus of parallel processing type using DDA method for processing image data, the apparatus comprising: memory means for memorizing the image data; input interface means for feeding a portion of the image data, extracted from the image data in the memory means, which are to be contracted, as series of predetermined number of bits starting from top of the image data in the memory means; DDA means for generating DDA bit pattern indicating valid bits in the series according to a given contraction rate; correction means for detecting those series which are fractional as a series of predetermined number of bits starting from top of the extracted image data, and generating correction bit pattern indicating validity of last bits of the series which are fractional as a series of predetermined number of bits; means for producing valid bit pattern indicating valid bits in the image data as the series of predetermined number of bits, in accordance with the DDA bit pattern and the correction bit pattern; and means for performing contraction of the extracted portion of the image data in accordance with the valid bit pattern.

According to another aspect of the present invention there is provided an image processing apparatus of parallel processing type using DDA method for processing image data, the apparatus comprising: memory means for memorizing the image data as first series of first predetermined number of bits; input interface means for feeding a portion of the image data, extracted from the image data in the memory means, which are to be contracted, as second series of second predetermined number of bits; DDA means for generating DDA bit pattern indicating valid bits in the second series according to a given contraction rate; correction means for detecting those second series which are fractional as a second series of second predetermined number of bits, and generating correction bit pattern indicating validity of last bits of the second series which are fractional as a second series of second predetermined number of bits; means for producing valid bit battern indicating valid bits in the image data as the second series of second predetermined number of bits, in accordance with the DDA bit pattern and the correction bit pattern; and means for performing contraction of the extracted portion of the image data in accordance with the valid bit pattern.

According to another aspect of the present invention there is provided an image processing apparatus of parallel processing type using DDA method for processing image data, the apparatus comprising: DDA means for generating DDA bit patterns; means for calculating an extraction starting bit width and an extraction ending bit width indicating a portion of the image data to be extracted; and means for performing contraction of the portion of the image data in accordance with the DDA bit patterns, the extraction starting bit width, and the extraction ending bit width.

Other features and advantages of the present invention will become apparent from the following description taken in conjunction with the accompanying drawings.

BRIEF DESCRIPTION OF THE DRAWINGS

FIG. 5 is a diagrammatic illustration of image data to be processed for explaining selective extractions to be performed in the image processor shown in FIG. 3.

FIG. 6 is a diagrammatic illustration of a part of image data to be processed and an example of a DDA bit pattern, a decoder output, OR gate output, and an input image data for explaining processing of fractional image data to be performed in the image processor shown in FIG. 3.

DETAILED DESCRIPTION OF THE PREFERRED EMBODIMENTS

Figure 1:
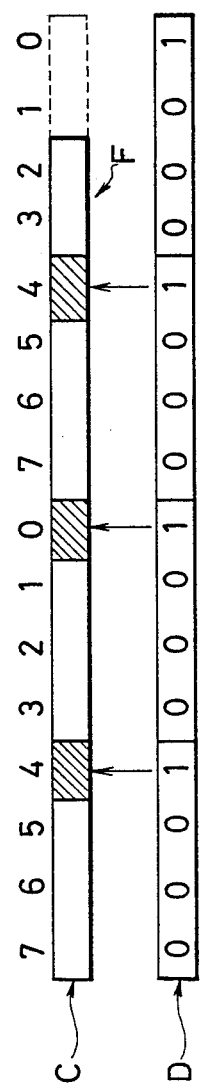
FIG. 1 is a diagrammatic illustration of a part of image data to be processed and examples of DDA bit patterns for explaining appearance of fractional image data in a conventional image processing apparatus.
Figure 2:
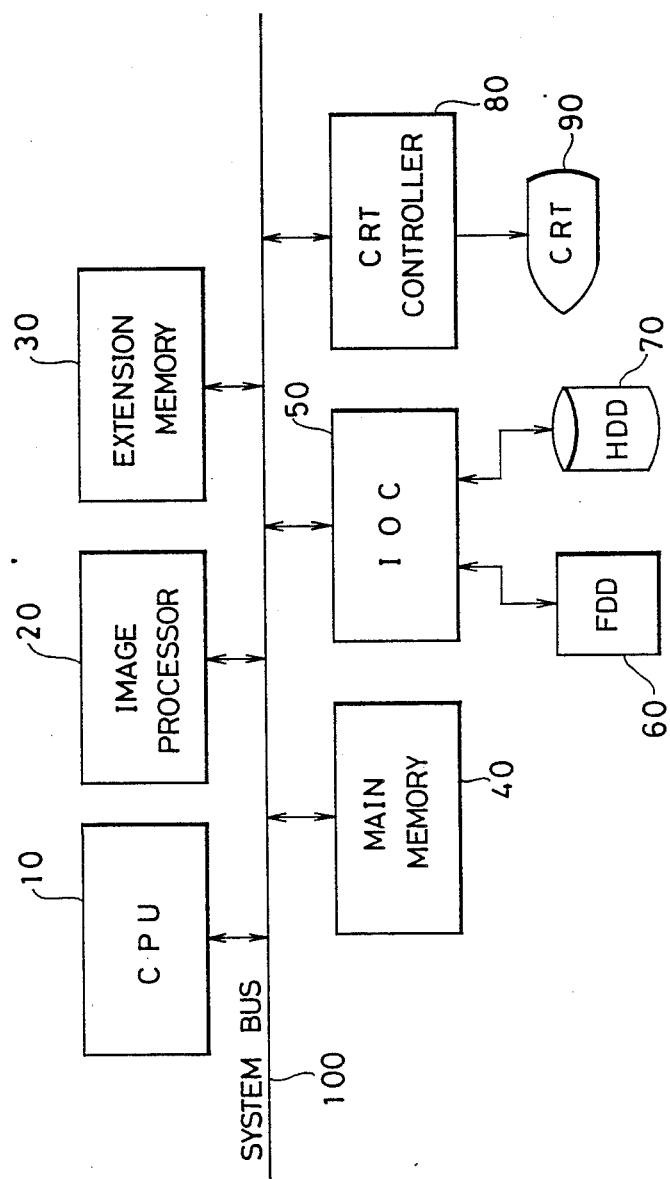
FIG. 2 is a schematic block diagram of an image processing apparatus according to the present invention.

Referring now to FIG. 2, there is shown on embodiment of an image processing apparatus according to the present invention.

In this embodiment, there are provided a CPU 10 for controlling operations of elements of the image processing apparatus, an image processor 20 for performing processing of image data, an extension memory 30 for storing image data before and after the processing, a main memory 40 for storing programs to be executed by the CPU 10, an input/output controller(IOC) 50 for controlling a floppy disk device(FDD) 60 and a hard disk device (HDD) 70, and a CRT controller 80 for controlling a CRT 90, all of which are interconnected through a system bus 100.

Figure 3:
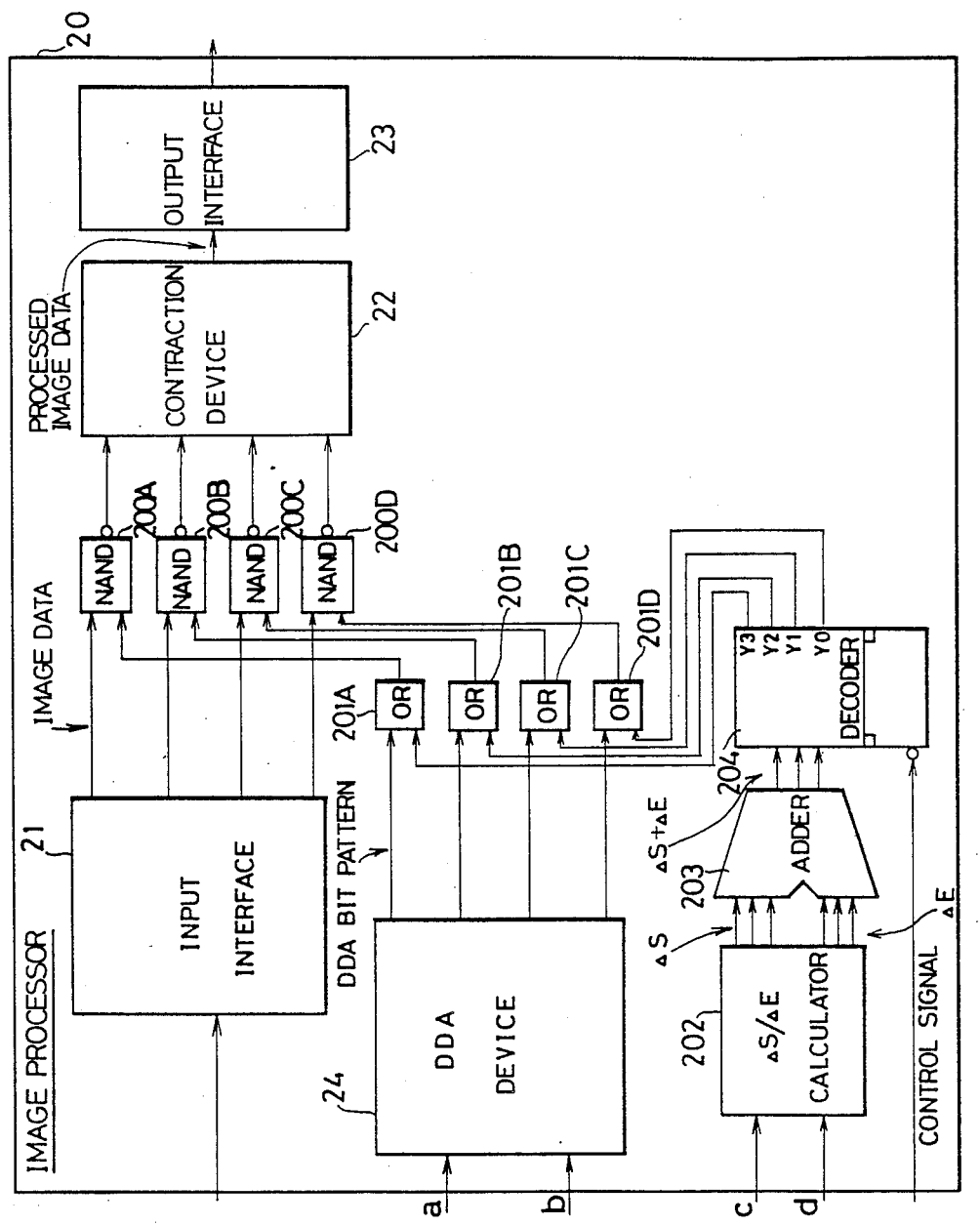
FIG. 3 is a block diagram of an image processor of the image processing apparatus shown in FIG. 2.

A detail configuration of the image processor 20 is shown in FIG. 3, in which the image processor 20 comprises an input interface 21 for introducing image data to be processed, a contraction device 22 for performing contraction of the image data, an output interface 23 for outputting processed image data, a DDA device 24 for generating DDA bit patterns to be explained in detail below, four NAND gates 200A to 200D whose outputs are transmitted to the contraction device 22, four OR gates 201A to 201D whose outputs are transmitted to the NAND gates 200A to 200D, a $\Delta S/\Delta E$ calculator 202 for calculating an extraction starting bit width $\Delta S$ and an extraction ending bit width $\Delta E$ from an extraction starting position c and an extraction ending position d to be supplied externally, an adder 203 for calculating a sum of the extraction starting bit width $\Delta S$ and the extraction ending bit width $\Delta E$, and a decoder 204 for producing a bit pattern from the sum calculated by the adder 203.

Both the DDA bit pattern from the DDA device 24 as well as the bit patterns from the decoder 204 are transmitted to the OR gates 201A to 201D, and both the image data from the input interface 21 as well as outputs of the OR gates 201A to 201D are transmitted to the NAND gates 200A to 200D. The decoder 204 is also supplied with a control signal which controls the operation of the decoder 204. The extraction starting bit width $\Delta S$, the extraction ending bit width $\Delta E$, the extraction starting position c, and the extraction ending position d will be explained in greater detail in the following.

The contraction device 22 is comprised of PAL(programmable array logic).

Figure 4:
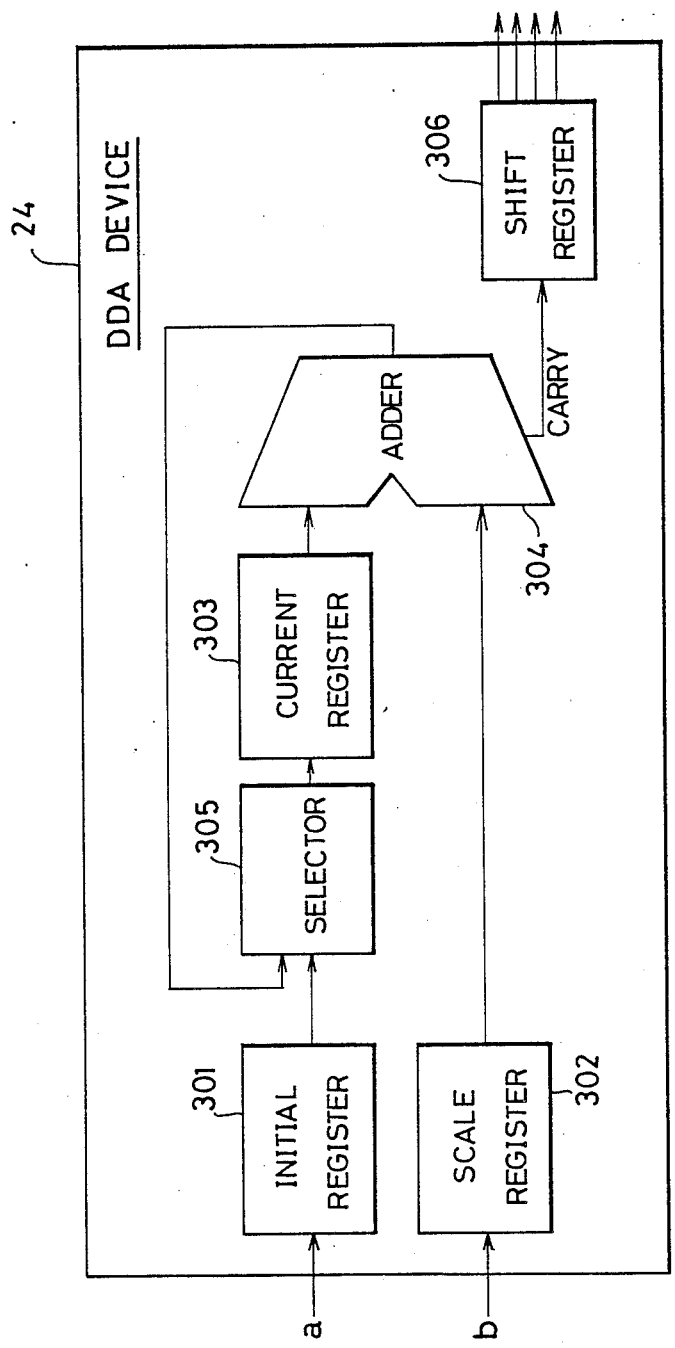
FIG. 4 is a block diagram of a DDA device of the image processor shown in FIG. 3.

A detail configuration of the DDA device 24 is shown in FIG. 4, in which the DDA device 24 comprises an initial register for registerring an initial value a to be given externally, a scale register 302 for registerring a scale value b also to be given externally, a current register 303 for registerring a current value, an adder 304 for calculating a sum of the current value and the scale value, as well as for producing a carry, a selector 305 for selecting one of the initial value and the sum calculated by the adder 304 and feeding the chosen one to the current register 303, and a shift register 306 for producing a DDA bit pattern from the carries. The initial value, scale value, current value, and carries will be explained in greater detail in the following.

This image processing apparatus operates as follows.

For displaying the image data stored in the FDD 60 or the HDD 70 on the CRT 90, the image data are transmitted through the IOC 50 to the image processor 20 which contracts the image data. The contracted image data are then stored in the extension memory 30 and subsequently given to the CRT 90 through the CRT controller 80 for display.

On the other hand, for recording images being displayed by the CRT 90 in the FDD 60 or the HDD 70, the image data stored in a display memory of the CRT 90 are transferred to the extension memory 30 and then transmitted to the image processor 20 which contracts the image data. The contracted image data are subsequently given to the FDD 60 or the HDD 70 through the IOC 50 for storing.

The operations of contractions by the image processor 20 will now be described for an exemplary case of processing a part 410 of an image data 400 to be processed shown in FIG. 5. In FIG. 5, dashed lines in the image data 400 indicate byte boundaries and each byte contains eight bit space labeled 7 to 0 by the scale shown below. FIG. 5 shows a situation in which the extraction starting position c is specified to be at a top of the second row at the sixth bit space from left, which is labeled 1, of the left side byte, and the extraction ending position d is specified to be at a bottom of the third row at the fourth bit space from left, which is labeled 4, so that the part 410 is a rectangle determined by the extraction starting position c and the extraction ending position d. A portion of the part 410 belonging to the upper row will be referred to as a byte piece 420. Once the extraction starting position c and the extraction ending position d are specified, the extraction starting bit width $\Delta S$ will be determined as a number of bit between the left end of the image data 400 and the extraction starting position c, and the extraction ending bit width $\Delta E$ will be determined as a number of bit between the extraction ending position d and a closet byte boundary to the left.

The image data 400 are introduced through the input interface 21, 4 bit in parallel at a time, to the NAND gates 200A to 200D. The NAND gates 200A to 200D are also supplied with a bit pattern from the OR gates 201A to 201D, and derives valid bit pattern indicating the validity of each 4 bit of the image data 400. The contraction device 22 contracts the image data according to this valid bit pattern, to produce processed image data. The processed image data are outputed through the output interface 23 to the system bus 100.

The bit pattern from the OR gates 201A to 201D are derived from a DDA bit pattern generated by the DDA device 24 and output signals Y0, Y1, Y2, and Y3 of the decoder 204. The output signals Y0, Y1, Y2, and Y3 are derived from the sum calculated by the adder 203 of the extraction starting bit width ΔS and the extraction ending bit width ΔE which in turn are derived from the extraction starting position c and the extraction ending position d by the ΔS/ΔE calculator 202. The correspondences between the sum and the output signals Y0, Y1, Y2, and Y3, all of which are to be given in binary, are summarized in the following Table 1.

TABLE 1

| SUM | OUTPUT SIGNALS | | | |
|-----|----|----|----|----|
|     | Y3 | Y2 | Y1 | Y0 |
| 000 | 0 | 0 | 0 | 1 |
| 001 | 0 | 0 | 1 | 1 |
| 010 | 0 | 1 | 1 | 1 |
| 011 | 1 | 1 | 1 | 1 |
| 100 | 0 | 0 | 0 | 1 |
| 101 | 0 | 0 | 1 | 1 |
| 110 | 0 | 1 | 1 | 1 |
| 111 | 1 | 1 | 1 | 1 |

Thus, for example, when the extraction starting bit width ΔS is '110' and the extraction ending bit width ΔE is '100', the summ will be '010' which is three lowest digits of an actual binary sum of '110' and '100'. The corresponding output signals Y3, Y2, Y1, and Y0 are '0111' in this order.

The decoder 204 is also supplied with a control signal. The output signals Y3, Y2, Y1, and Y0 are reset to '0000' when the control signal is in 'off' state, and the values summarized in the Table 1 above are outputted only when the control signal is in 'on' state.

On the other hand, the DDA bit pattern is generated as follows. For example, when an image data of M dots are to be contracted to N dots (M, N in Hexadecimal, 1≦N≦M≦FFFH ), quotient and residue obtained by dividing 1000H×N by M will be assigned as the scale value and the initial value, respectively, i.e., $$\frac{1 \times 1000H}{4} = 400H, \text{ residue } 0H$$

so that the initial value is 0H, and the scale value is 400H. The selector 305 selects the initial value at first and the sum calculated by the adder 304 subsequently. Thus, as the DDA device 24 operates, the following equations is realized in sequence:

| Current register 303 |   | Scale register 302 | Adder 304 |   | Carry |
|---|---|---|---|---|---|
| 0H   | + | 400H | = (0)400H | | 0 |
| 400H | + | 400H | = (0)800H | | 0 |
| 800H | + | 400H | = (0)C00H | | 0 |
| C00H | + | 400H | = (1)000H | | 1 |

The carry is determined as a fifth digit of the sum which will be omitted from the output of the adder 304. The shift register compiles four carries, 0001 in the above example, and transmits these compiled carries as a DDA bit pattern.

After the part 410 is extracted, bit spaces in the part 410 are re-labeled, as shown in FIG. 6 for the byte piece 420, from the left end to the right end. As shown in FIG. 6, since the byte piece 420 contains fourteen bit spaces, a left byte of the byte piece 420 is complete, but a right byte of the byte piece 420 is incomplete, containing only six bit spaces. As a result, when compared with DDA bit pattern 430 which is a series of a bit pattern '0001' indicating contraction to one fourth, there will be an error due to two bit space missing from the byte piece 420. However, in this embodiment, the extraction starting bit width ΔS is '110' (six in decimal) and the extraction ending bit width ΔE is '100' (four in decimal) so that the sum calculated by the adder 203 is '010' as a fourth digit is to be omitted, and consequently the bit pattern from the decoder 204 is '0111' according to the Table 1. This means an output 440 of the decoder 204 appears as shown in FIG. 6, so that an output 450 of the OR gates 201A to 201D appears as shown in FIG. 6. Thus, when an output of the input interface 21 shown in FIG. 6 comes in, the output of the NAND gates 200A to 200D is in the form of the byte piece 420 shown in FIG. 6 with only shaded bit spaces valid. In particular, the bit space labeled by 2 of the right byte of the byte piece 420 is now correctly valid.

As explained, according to the present invention, it is possible for an image processing apparatus of parallel processing type using DDA method to process fractional image data properly by a simple configuration.

It is to be noted that many modifications and variations of this embodiment may be made without departing from the novel and advantageous features of the present invention. Accordingly, all such modifications and variations are intended to be included within the scope of the appended claims.

What is claimed is:

1. An image processing apparatus of parallel processing type using DDA method for processing image data, the apparatus comprising:
   input interfacee means for feeding image data to be contracted as series of predetermined number of bits;
   DDA means for generating DDA bit pattern indicating valid bits in the series according to a given contraction rate;
   correction means for detecting those series which are fractional as a series of predetermined number of bits, and generating correction bit pattern indicating validity of last bits of the series which are fractional as a series of predetermined number of bits;
   means for producing valid bit pattern indicating valid bits in the image data as the series of predetermined number of bits, in accordance with the DDA bit pattern and the correction bit pattern; and
   means for performing contraction of the image data in accordance with the valid bit pattern.

2. The apparatus of claim 1, wherein the correction means generates the correction bit pattern only when the image data are not fractional as a series of predetermined number of bits, and wherein the producing means produces the valid bit pattern in accordance with the DDA bit pattern only when the image data are not fractional as a series of predetermined number of bits.

3. The apparatus of claim 1, wherein the producing means comprises plurality of OR gates which output OR of the DDA bit pattern and the correction bit pattern as the valid bit pattern.

4. An image processing apparatus of parallel processing type using DDA method for processing image data, the apparatus comprising:

memory means for memorizing the image data;

input interface means for feeding a portion of the image data, extracted from the image data in the memory means, which are to be contracted, as series of predetermined number of bits starting from top of the image data in the memory means;

DDA means for generating DDA bit pattern indicating valid bits in the series according to a given contraction rate;

correction means for detecting those series which are fractional as a series of predetermined number of bits starting from top of the extracted image data, and generating correction bit pattern indicating validity of last bits of the series which are fractional as a series of predetermined number of bits;

means for producing valid bit pattern indicating valid bits in the image data as the series of predetermined number of bits, in accordance with the DDA bit pattern and the correction bit pattern; and means for performing contraction of the extracted portion of the image data in accordance with the valid bit pattern.

5. The apparatus of claim 4, wherein the correction means generates the correction bit pattern only when the image data are not fractional as a series of predetermined number of bits, and wherein the producing means produces the valid bit pattern in accordance with the DDA bit pattern only when the image data are not fractional as a series of predetermined number of bits.

6. The apparatus of claim 4, wherein the producing means comprises plurality of OR gates which output OR of the DDA bit pattern and the correction bit pattern as the valid bit pattern.

7. An image processing apparatus of parallel processing type using DDA method for processing image data, the apparatus comprising:

memory means for memorizing the image data as first series of first predetermined number of bits;

input interface means for feeding a portion of the image data, extracted from the image data in the memory means, which are to be contracted, as second series of second predetermined number of bits;

DDA means for generating DDA bit pattern indicating valid bits in the second series according to a given contraction rate;

correction means for detecting those second series which are fractional as a second series of second predetermined number of bits, and generating correction bit pattern indicating validity of last bits of the second series which are fractional as a second series of second predetermined number of bits;

means for producing valid bit pattern indicating valid bits in the image data as the second series of second predetermined number of bits, in accordance with the DDA bit pattern and the correction bit pattern; and means for performing contraction of the extracted portion of the image data in accordance with the valid bit pattern.

8. The apparatus of claim 7, wherein the first predetermined number is an integer multiple of the second predetermined number, and wherein the correction means detects those second series which are fractional as a second series of second predetermined number of bits by first detecting leftmost and rightmost first series which are fractional as a first series of first predetermined number of bits from the left and right end bits of the extracted portion in the image data in the memory means, and then dividing the extracted portion into second series of second predetermined number of bits from top of the extracted portion.

9. The apparatus of claim 8, wherein the correction means comprises:

means for deriving leftmost and rightmost first series which are fractional as a first series of first predetermined number of bits from the left and right end bits of the extracted portion in the image data in the memory means;

means for calculating a sum of number of bits in the leftmost and the rightmost first series; and decoder means for generating the correction bit patedrn indicating validity of last bits of the second series which are fractional as a second series of second predetermined number of bits, in accordance with the sum from the calculating means.

10. The apparatus of claim 7, wherein the correction means generates the correction bit pattern only when the image data are not fractional as a series of predetermined number of bits, and wherein the producing means produces the valid bit pattern in accordance with the DDA bit pattern only when the image data are not fractional as a series of predetermined number of bits.

11. The apparatus of claim 7, wherein the producing means comprises plurality of OR gates which output OR of the DDA bit pattern and the correction bit pattern as the valid bit pattern.

12. An image processing apparatus of parallel processing type using DDA method for processing image data, the apparatus comprising:

DDA means for generating DDA bit patterns;

means for calculating an extraction starting bit width and an extraction ending bit width indicating a portion of the image data to be extracted; and means for performing contraction of the portion of the image data in accordance with the DDA bit patterns, the extraction starting bit width, and the extraction ending bit width.

13. The apparatus of claim 12, wherein the performing means includes means for deriving bit patterns indicating presence of fractional image data, from the extraction starting bit width and the extraction ending bit width.

14. The apparatus of claim 13, wherein the derived bit patterns further indicate that a last bit of the fractional image data is valid.

15. The apparatus of claim 14, wherein the performing means further includes:

OR gates to which the DDA bit patterns and the derived bit patterns are given; and NAND gates to which the iamge data and outputs of OR gates are given.

* * * * *